United States Patent
Brundridge et al.

(10) Patent No.: US 8,707,290 B2
(45) Date of Patent: Apr. 22, 2014

(54) FIRMWARE UPDATE IN AN INFORMATION HANDLING SYSTEM EMPLOYING REDUNDANT MANAGEMENT MODULES

(75) Inventors: Michael A. Brundridge, Georgetown, TX (US); Paul Vancil, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1534 days.

(21) Appl. No.: 11/359,049

(22) Filed: Feb. 22, 2006

(65) Prior Publication Data

US 2007/0234332 A1 Oct. 4, 2007

(51) Int. Cl.
- G06F 9/44 (2006.01)
- G06F 15/16 (2006.01)

(52) U.S. Cl.
USPC .......................................... 717/171; 709/209

(58) Field of Classification Search
None
See application file for complete search history.

(56) References Cited

U.S. PATENT DOCUMENTS

| | | | | |
|---|---|---|---|---|
| 5,313,386 A | * | 5/1994 | Cook et al. | 714/10 |
| 6,058,445 A | * | 5/2000 | Chari et al. | 709/223 |
| 6,675,258 B1 | | 1/2004 | Bramhall et al. | G06F 13/00 |
| 6,883,065 B1 | * | 4/2005 | Pittelkow et al. | 714/6 |
| 6,931,568 B2 | * | 8/2005 | Abbondanzio et al. | 714/11 |
| 7,062,676 B2 | * | 6/2006 | Shinohara et al. | 717/171 |
| 7,240,188 B2 | * | 7/2007 | Takata et al. | 717/168 |
| 7,600,055 B2 | * | 10/2009 | Douglas et al. | 714/6 |
| 7,647,427 B1 | * | 1/2010 | Devarapalli | 709/208 |
| 2005/0257213 A1 | | 11/2005 | Chu et al. | G06F 9/44 |
| 2007/0220301 A1 | * | 9/2007 | Brundridge et al. | 714/4 |

OTHER PUBLICATIONS

Microsoft. "FTP, Microsoft Computer Dictionary" May 1, 2002. Microsoft Press. Fifth edition. pp. 1-5. Retrieved from Proquest Safari Books on Mar. 9, 2010.*

* cited by examiner

Primary Examiner — Don Wong
Assistant Examiner — Erika Kretzmer
(74) Attorney, Agent, or Firm — Baker Botts L.L.P.

(57) ABSTRACT

An information handling system includes a set of processing resources and a management resource. The processing resources include a microprocessor and memory accessible to the microprocessor. The management resource is operable to power-up, reset, and power-off the processing resources. The management resource includes a first management module and a redundant second management module. The management resource responds to a single firmware update request by updating firmware on the first management module while maintaining the second management module in a slave mode and, upon successfully updating the firmware on the first management module, updating firmware on the second management module while maintaining the first management module in a passive mode.

20 Claims, 7 Drawing Sheets

FIRMWARE UPDATE IN AN INFORMATION HANDLING SYSTEM EMPLOYING REDUNDANT MANAGEMENT MODULES

TECHNICAL FIELD

The present invention is related to the field of computer systems and more specifically to computer systems employing management modules and, still more specifically, systems employing redundant modules.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling device is a server, which is a processor-based device on a network that manages network resources. As examples, a file server is dedicated to storing files, a print server manages one or more printers, a network server manages network traffic, and a database server processes database queries. A Web server services Internet World Wide Web pages.

In recent years, servers have been produced as "blade servers", which are thin, modular electronic circuit boards, containing one or more microprocessors, memory, and other server hardware and firmware. Blade servers can be easily inserted into a space-saving rack with many other blade servers. Blade servers are sometimes referred to as a high-density servers. They are often used in clusters of servers dedicated to a single task.

Blade servers may employ management cards or management modules to provide remote management capability. Reliability may be improved by incorporating a "spare" or redundant management module. Management modules include firmware that may updated from time to time. In conventional blade servers with redundant management modules, firmware updates are prone to error because the user or administrator must remember to update both management modules by essentially performing the same firmware update produced two times in a row.

SUMMARY OF THE INVENTION

Therefore a need has arisen for an information handling system operable to update the firmware in a redundant pair of management modules.

The present disclosure describes a system and method for updating management resource firmware in a management resource employing redundant management modules.

In one aspect, a disclosed information handling system includes a set of processing resources and a management resource. The processing resources include a microprocessor and memory accessible to the microprocessor. The management resource is operable to power-up, reset, and power-off the processing resources. The management resource includes a first management module and a redundant second management module. The management resource responds to a single firmware update request by updating firmware on the first management module while maintaining the second management module in a slave mode and, upon successfully updating the firmware on the first management module, updating firmware on the second management module while maintaining the first management module in a slave mode.

In another aspect a disclosed computer program (software) product includes instructions for updating firmware in a management resource of an information handling system. The instructions include instructions for responding to a firmware update request by initiating a firmware update of a first management module of a management resource and causing a second management module to enter a slave waiting state for a specified duration. The software further includes instructions for sending a message from the first management module to the second management module upon successful completion of the firmware update and instructions for responding to expiration of the specified time period without the first management module sending the successful message by causing the second management module to become the master. The instructions still further include instructions for responding to the successful completion message being sent from the first management module to the second management module by initiating a firmware update of the second management module.

In yet another aspect, a disclosed method of updating firmware in a management resource of an information handling system includes transferring a firmware image from a networked server to a flash memory device of a first module of the management resource in response to a firmware update request and transferring the firmware image from the networked server to a flash memory device of the redundant second module in response to successfully transferring the firmware image to the first module. The method further includes causing the second module to assume control in response to a specified duration expiring before successfully transferring the firmware image to the flash memory device of the first module.

The present disclosure includes a number of important technical advantages. One technical advantage is the ability to update firmware on redundant management modules using a single request thereby reducing the risk of encountering a system with redundant modules having different firmware versions. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to the drawings wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Preferred embodiments and their advantages are best understood by reference to FIG. 1 through FIG. 7, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As indicated in the Background, one type of information handling system is a server system. In general terms, a server system communicates with one or more client systems for the purposes of exchanging information and performing transactions.

Figure 1:
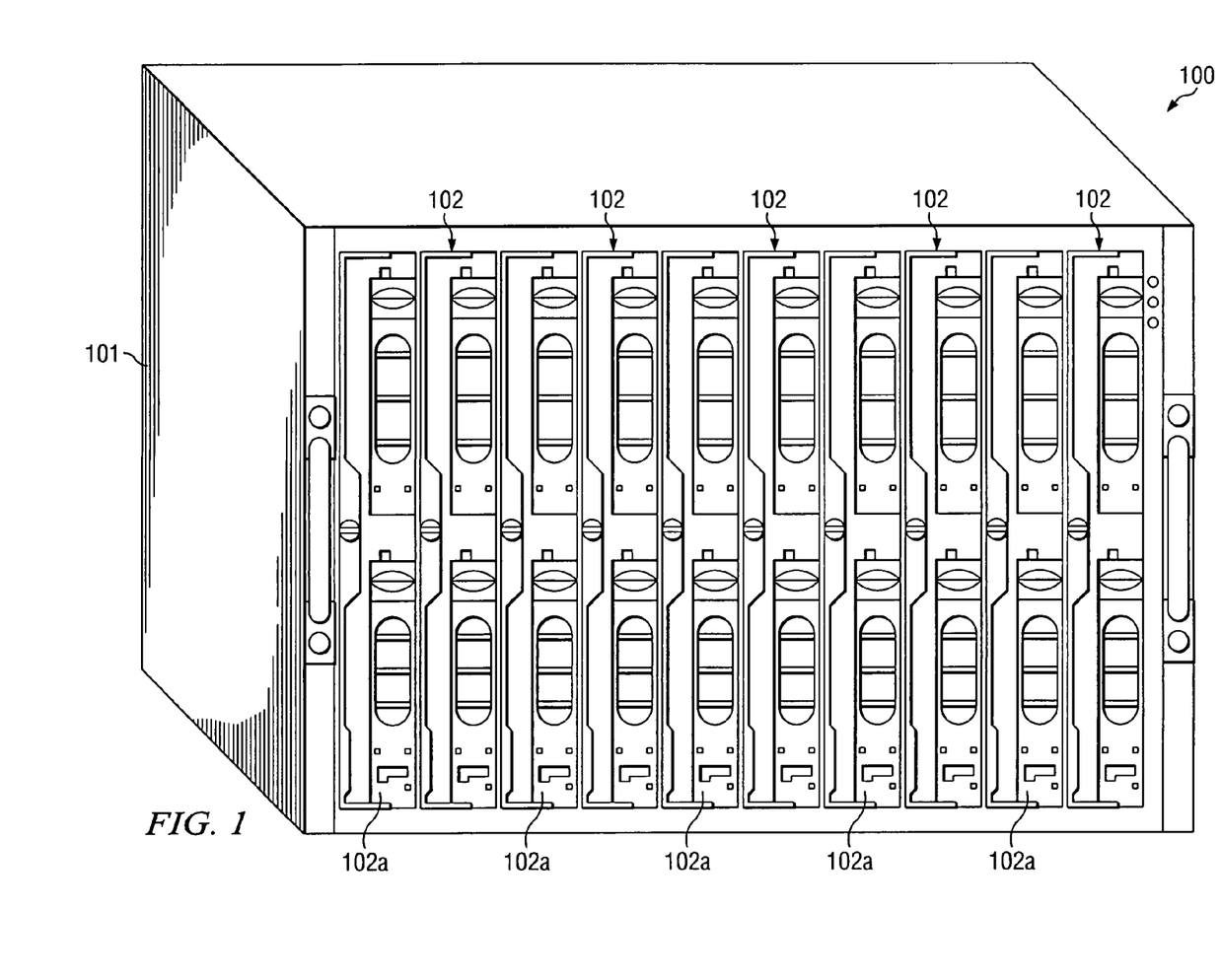
FIG. 1 is a front perspective view of a server system.

FIG. 1 is a front perspective view of a server system 100 enclosed within a chassis 101. Chassis 101 contains processing resources including a general purpose microprocessor and system memory accessible to the microprocessor. In the depicted implementation, chassis 101 is a modular enclosure that accepts processing resources in the form of one or more server modules 102. In the example of this description, server system 100 is also referred to as "blade" server 100, and each server module 102 is also referred to as server blade 102. As described in the Background, server blades 102 is preferably thin, modular, electronic circuit boards containing one or more general purpose microprocessors, memory, and other hardware and firmware. However, as mentioned above, any other type of modular server or modular computer system having remote access capability may be substituted.

Server blades 102 are preferably "hot pluggable", meaning that the can be installed or removed without powering off other portion of blade server 100 or powering off other server blades 102. Blade server 102 may include a power-on button that permits each server blade 102 to be independently powered on or off. In the example of FIG. 1, server system 100 accommodates ten server blades 102. Other embodiments may include more or fewer server blades or other non-blade type modules. For example, server modules 102 may be a type of server module referred to as a "brick" server module.

Figure 2:
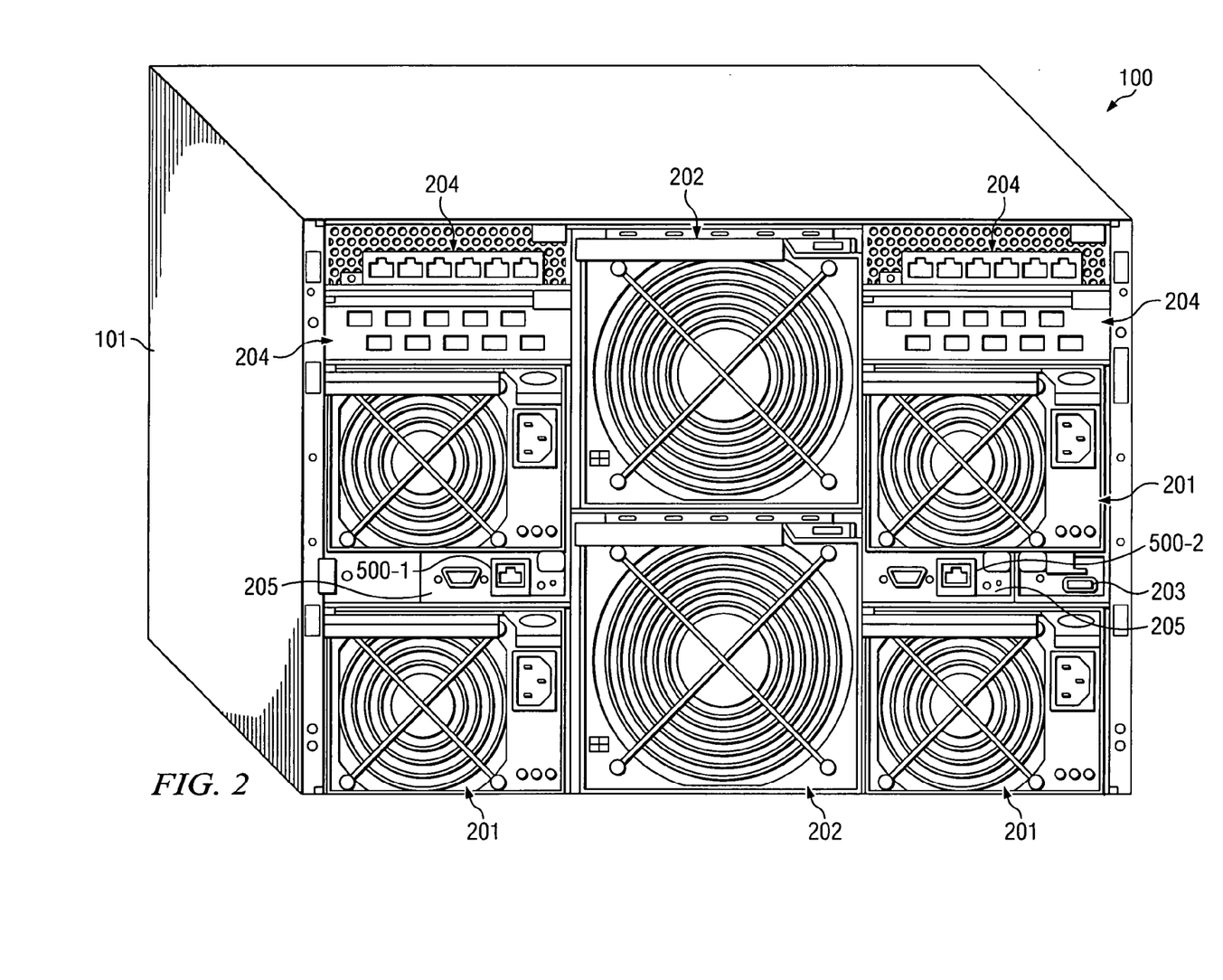
FIG. 2 is a rear perspective view of the server system of FIG. 1, showing various rear modules associated with the chassis.
Figure 3:
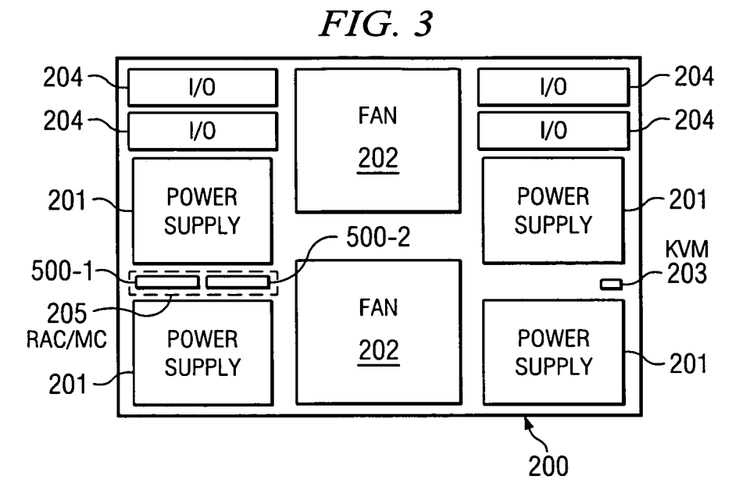
FIG. 3 is a block diagram of the rear modules of FIG. 2.

FIG. 2 is a back perspective view of server system 100, and various rear modules 201-205 associated with the chassis 101. FIG. 3 is a schematic view of the same rear modules.

Referring to both FIG. 2 and FIG. 3, the rear modules include redundant power supplies 201, redundant cooling fans 202, and an analog or digital keyboard, video, and mouse (KVM) switch 203. Four I/O modules 204 provide various I/O communication and network capabilities, such as for Ethernet or fibre channel connections. A RAC/MC (Remote Access Controller/Modular Chassis) unit 205, also referred to herein RAC 205) provides for remote management of the chassis 101, blade servers 102, power supply modules 201, fan modules 202, digital KVM module 203, and I/O modules 204. RAC 205 is a system management resource that may be implemented with a first management module referred to herein as remote access control (RAC) module 500-1 and a second management module referred to as second RAC module 500-2. First and second RAC modules 500-1 and 500-2 may be physically distinct modules as shown in FIG. 2 or, alternatively, first and second RAC modules 500-1 and 500-2 may be combined and placed in a single slot of chassis 101 as indicated in FIG. 3.

RAC 205 performs tasks including health reporting, power management, thermal management, fabric consistency validation, event log reporting, user interfaces, alerting, and inventory reporting. RAC 205 has remote access hardware for remote management. Chassis 101 has appropriate ports, such as Ethernet and fibre channel ports associated with the I/O modules 204. An analog KVM module 203 supports video and PS/2 connections, a digital KVM also supports an RJ45 Ethernet port for KVM over IP. The RAC 205 and its RAC modules 500-1, 500-2 each have serial and Ethernet connections each coupled with a communication network. Blade server 100 communicates with remote information handling devices using a communication protocol over a network. The communication network may be an Ethernet network, Fast Ethernet or other type of local or wide area network (LAN or WAN), a point-to-point network provided by telephone services, or other type of communication network or combination of networks.

Figure 4:
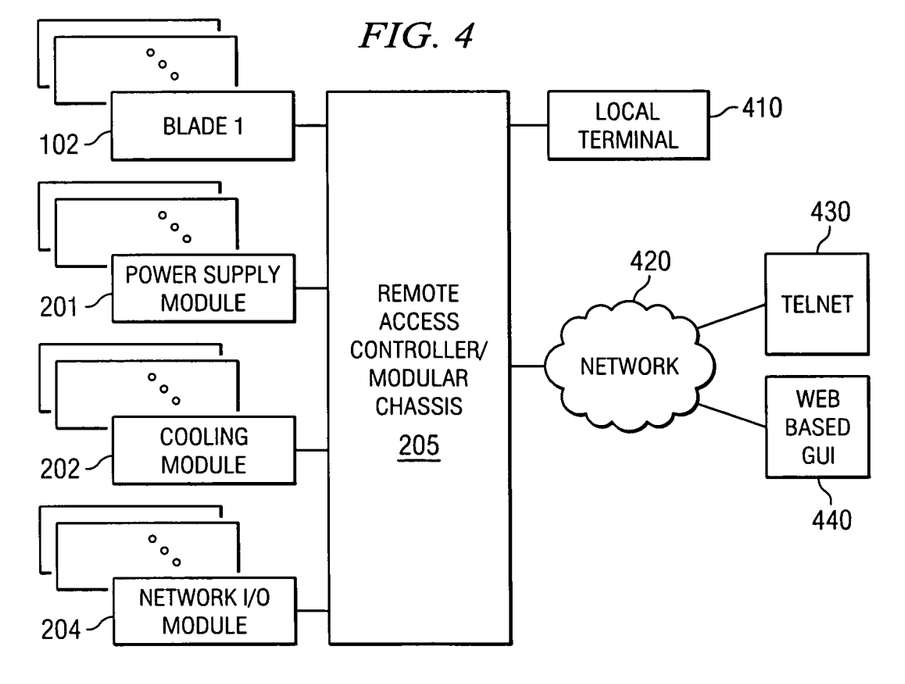
FIG. 4 is an exemplary circuit diagram of the modules of a blade server chassis.

FIG. 4 illustrates internal and external coupling of the RAC 205 for one embodiment. In the depicted embodiment, RAC 205 is coupled with all front and rear modules of blade server 100 as shown by the connections on the left side of FIG. 4. On the right side of the RAC 205 in FIG. 4, the possible external components are shown. For example, the RAC/MC can be coupled with a local terminal 410 through a local serial port. Also, the RAC 205 can be connected to remote control units, such as, a Telnet service 430 or a web based graphical user interface 440 through an Ethernet network connection.

RAC 205 is used to control all modules within blade chassis 101. An administrator or user accesses RAC 205 through its Ethernet or serial coupling. RAC 205 is preferably connected to the server blades 102 and other modules of blade server 100 through an out of band interface such as an I2C network. The embodiment of RAC 205 depicted in FIG. 5 incorporates redundancy to increase reliability and prevent scenarios in which a stand alone RAC fails to operate properly and is rendered inoperable, For purposes of discussing FIG. 5, first RAC module 500-1 of RAC 205 is referred to as master RAC module 500-1 and second RAC module 500-2 is referred to as slave RAC module 500-2. RAC modules 500-1 and 500-2, preferably have identical or functionally equivalent hardware and include a main RAC processor (501, 511) that is coupled to a serial synchronization bus (507, 517). Serial synchronization buses 507 and 517 are coupled to provide a primary communication path 590 between the RAC modules 500-1 and 500-2. Furthermore, each RAC module 500-1, 500-2 includes a heartbeat device (506, 516), a direct control bus logic device (503, 513), a switching logic device (505, 515), and I$^2$C buses (502, 512), each coupled with the RAC processors (501, 511), respectively. In the depicted embodiment, RAC modules 500-1 and 500-2 include their own respective Ethernet units (508, 518) and dedicated Ethernet ports (570, 580).

Figure 5:
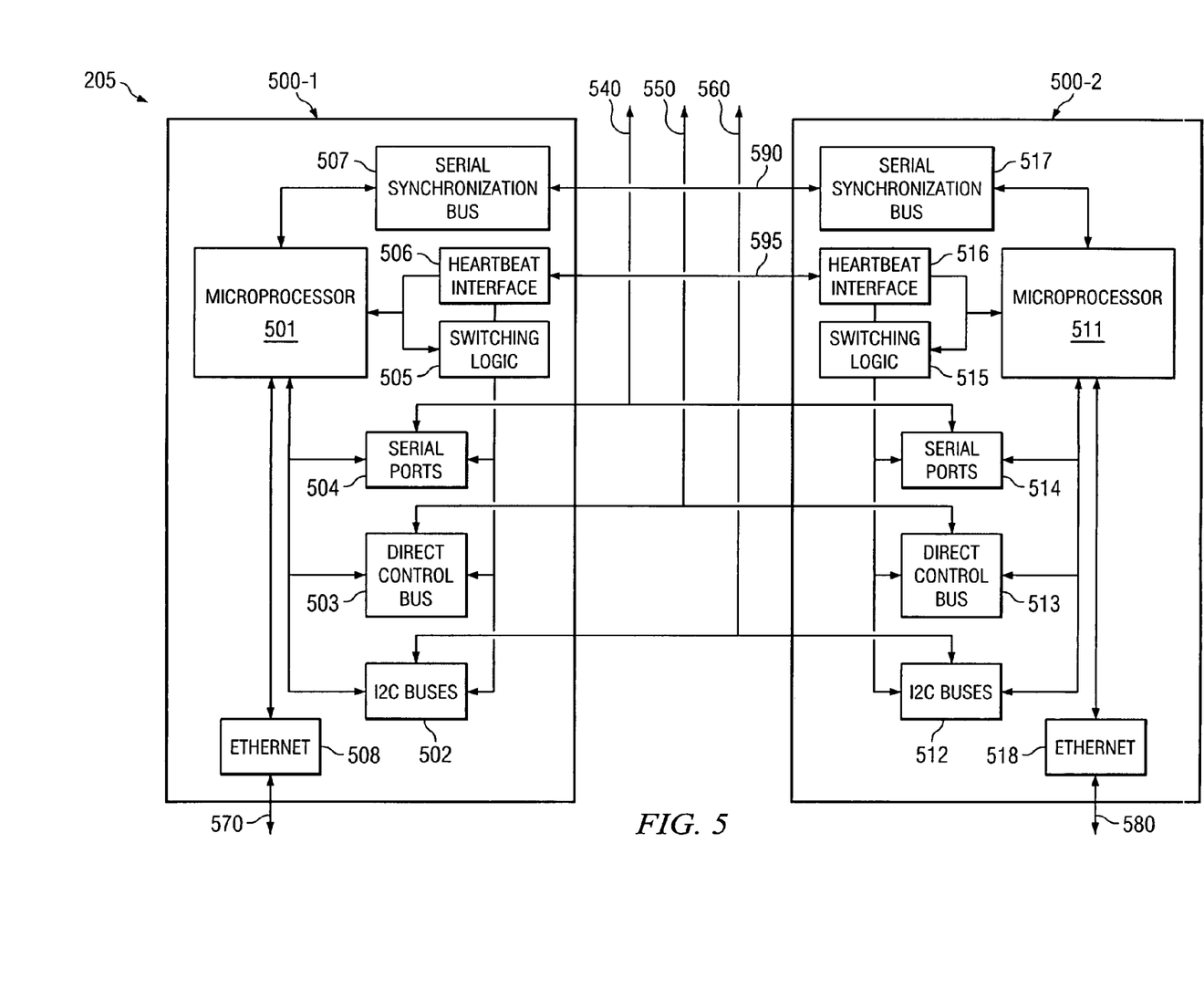
FIG. 5 is an embodiment of a RAC module according to the invention.

Serial ports 504 and 514 are provided to allow text console redirection to a blade, or text console to an I/O Module. Only one of the modules 500-1 and 500-2, however, actively controls these units to provide signals as will be explained in more detail below. The operation mode, namely master or slave mode, is setup by means of soft- or firmware during power up of the respective units. A combination of hardware logic and firmware logic provide for a voting system to determine which RAC module will be the master.

The I$^2$C buses 502 and 512 of RAC modules 500-1 and 500-2 are coupled to provide an internal communication path for controlling the modules of the chassis as indicated by port 560, and are isolated between the master and the slave RAC modules 500-1 and 500-2 by means of switching logic 505 and 515. Also, heartbeat device 506 and 516 of modules 500-1 and 500-2 are linked together by coupling 595 as will be explained in more detail below.

The operating environment for first RAC module 500-1 provides for controlling Ethernet port 570 or 580 during normal operation of RAC 205, i.e. when the designated module is in master mode. Thus, during normal operation, the slave Ethernet port connection 580 has no active TCP/IP stack and can be used to only monitor the status of the LINK status (cable connection to its own respective port). Similarly, the heartbeat device 506 of the master RAC module 500-1 provides for a heartbeat signal which is monitored by the slave RAC module's 500-2 heartbeat device 516. The heartbeat device, thus, provides for both functions, generating a heartbeat signal and for monitoring a heartbeat signal depending on whether the respective module is in master or slave mode.

During normal operation, master RAC module 500-1 performs all control and management functions through the I$^2$C buses and the slave RAC module 500-2 merely monitors the activities of the master RAC module 500-1 for any type of malfunctioning. Switching logic selects the master that owns the buses based on who is master and controls the I$^2$C isolation logic which can isolate the I$^2$C busses, the direct control bus, and the serial buses of the slave RAC module from actively transmitting any type of signal. Malfunctioning can be, for example, detected in one embodiment of the present application if a heartbeat signal is not generated, for example, for a time period of 5 seconds. Once such a malfunction is detected, the slave RAC module 500-2 will assume master role. Thus, slave RAC module 500-2 will become the master RAC module and the defective master RAC module 500-1 will be disconnected by means of the switching logic.

The various buses (serial, I2C, direct control, etc.) will be isolated by means of the switching logic and are controlled as follows. If possible, switching logic 505 will be controlled to de-couple from the I$^2$C bus 560 and switching logic 515 is controlled to enable the I$^2$C bus for slave RAC module 500-2. The direct control bus will be controlled to de-couple from the direct control bus port 550 and direct control logic device 513 is controlled to enable the slave RAC modules 500-1 direct control bus. The serial bus 504 will be de-coupled from the serial bus port 540 by means of the switching logic 505 and serial port 514 will be enabled on RAC module 500-1 by switching logic 515. In case of a total malfunctioning of the master RAC module 500-1, no further action might be necessary and the slave RAC module 500-2 can, for example, be able to actually reset the old master RAC module and perform all other necessary couplings and de-couplings.

Figure 6A:
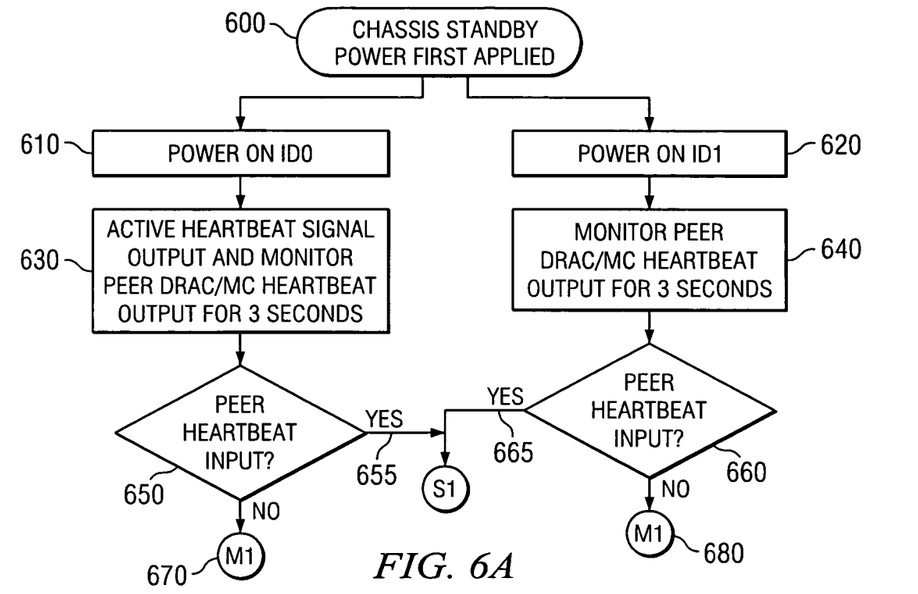
FIG. 6A-C are flow charts of the operation of a RAC module as shown in FIG. 5.
Figure 6B:
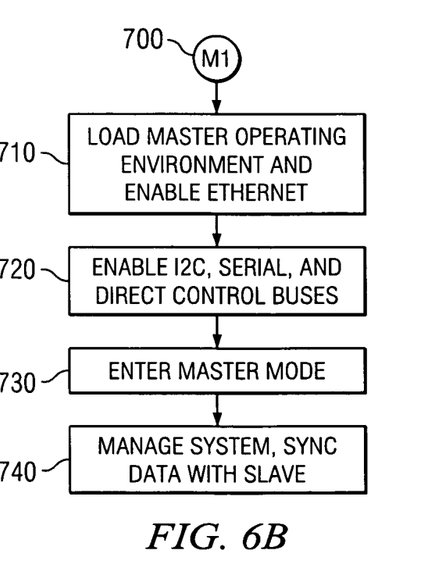
Figure 6C:
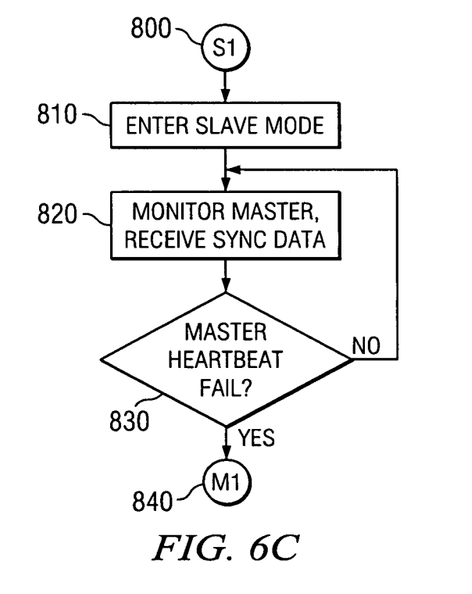

FIG. 6A-C shows flow charts of the operation of master and slave RAC modules 500-1, 500-2. Within the chassis, when any of the power supply units 201 is coupled with an AC input power supply it will provide a standby supply voltage, for example 5V, on the internal standby rail in step 600 as shown in FIG. 6A. When this standby voltage is first applied to the rail, the two RAC modules 500-1 and 500-2 will start their initial firmware load at roughly the same time in steps 610, 620, respectively. Both RAC modules will reach a point in the boot process where they will enter the master RAC module election phase to elect a master RAC module. The RAC module labeled as ID0 if present and functioning will generate an active heartbeat signal in step 630. In one embodiment, the ID0 module can also monitor the heartbeat of the ID1 module as indicated in step 630. ID1 RAC module 500-2 monitors the heartbeat, for example, for 3 seconds, to initially determine whether the ID0 RAC module 500-1 is present and operating properly in step 640. If in step 650 it has been decided that the ID0 RAC module 500-1 functions properly, the ID0 RAC module 500-1 enters master mode at 670 and RAC module 500-2 enters into the slave mode in step 665. In master mode as shown in FIG. 6B, the RAC module 500-2 loads its master operating environment and enables the Ethernet port 570 in step 710. In step 720 the I2C unit 502, the serial unit 504 and the direct control bus unit 503 are enabled. Thus, RAC module 500-1 is set into master mode in step 730 and will manage the system, synchronize data with the slave RAC module 720 in step 740.

However, if there is no functioning RAC module 500-1, then RAC module 500-2 will enter master mode at 680 and perform the steps 700-740 as discussed above. Otherwise, the slave RAC module enters the slave mode in step 810 via step 665 as shown in FIG. 6C. To this end, after the initial power up, the slave continues to monitor the heartbeat signal of the master and synchronize data with the master as shown in steps 820 and 830 of FIG. 6C.

The active Ethernet port can, thus, be switched from RAC module 500-1 to RAC module 500-2. In other words, the so far established Ethernet connection is terminated and the Ethernet connection to the thus dormant module is then activated. This switching is performed in a way that the actual IP address used for that specific port is maintained as will be explained in more detail below. Therefore, externally no action will be necessary to maintain the functionality of the server system. In one embodiment, this is done by an RAC/MC firmware control. Only a master RAC module has the TCP/IP stack loaded, so once a unit fails and is reset, its TCP stack is not loaded unless it is a master. When it becomes master, it will load the TCP stack. Thus, when RAC module 500-1 fails, and RAC module 500-2 assumes the master role, Ethernet connection 570 is disabled by RAC reset, and Ethernet connection 580 is loaded by firmware loading to become the master RAC module. The I$^2$C bus is used to control the internal units of the chassis, for example, via port 560. Thus, the switching logic 505 and 515 provide for the proper circuitry to deactivate and activate the respective units 502, 512, 503, 513, 504, and 514 to provide for only one unit controlling these buses and ports 540, 550, and 560.

In normal operation, RAC module 500-1 is set up to control the I$^2$C bus, direct control bus 550, serial buses 540, and the external Ethernet connection 570 while RAC module 500-2 monitors the operation of RAC module 500-1 for malfunctioning. The master RAC module 500-1, thus, sets up a remote connection using the necessary protocol, such as any appropriate web protocol, a simple network management protocol (SNMP), or telnet protocol. Similarly, the I$^2$C bus for controlling the different modules and units use an appropriate protocol for communication, such as Intelligent Platform Management Interface (IPMI) or Intelligent Platform Management Bus (IPMB) protocol. The serial communication bus is utilized for console redirection of the server blades and I/O modules. The serial synchronization bus 590 is used for communication between the master and the slave RAC module 500-1, 500-2. Through this link, for example, date and time can be synchronized, exchange information about the Field Replaceable Unit (FRU) of master and slave RAC module, baud rates, status, and upgrade information.

The heartbeat units 506 and 516 are the main devices to ensure proper operation of the master RAC module 500-1 as explained above. Generally, most system failures will lead to a lack of the heartbeat signal, such as, when the masters firmware core locks up, the masters hardware has a fault, the masters network cable or connection is lost, the master is removed by the user, the master is restarted via the user or some event, etc. However, other events and monitoring techniques can be used instead or in addition. For example, the serial port or even the I$^2$C bus could be used for sending and receiving a heartbeat signal. Also, the slave RAC module could in addition monitor the signal traffic on any or all of the direct control bus, the serial connection, and the I$^2$C bus for inconsistencies in the communications as, for example, previously defined or known to the system.

In one embodiment, the system can be set up in such a way that very little communication between the master and slave RAC modules 500-1, 500-2 is necessary. For example, all system configurations and logs can be stored within the chassis in a non-volatile memory, such as, an EEPROM. In one embodiment the master RAC module 500-1 can synchronize date and time with the slave RAC module 500-2 whenever necessary, for example, if the user changes the time, at startup or at any other appropriate time. The FRU information can be exchanged or requested from the slave RAC module, for example, when a factory FRU programming has been performed.

Master and Slave RAC modules may have the same internet protocol (IP) address in case a switchover from the master to the slave is performed. They also may have the same media access control (MAC) address. In slave mode, RAC module 500-2 will not respond to any requests of a user regarding the management of the chassis. This can only be performed by the master RAC module. The IP address can be either predetermined, such as a fixed address, and can be known to the modules or be determined and communicated to both modules. If the master RAC module determines the IP address it can store it within the chassis, for example, in the EEPROM or in any other appropriate memory. When the slave RAC module 500-2 takes over control and becomes the master RAC module, it will retrieve the last used IP address from, for example, the EEPROM located within the chassis. Alternatively, once the IP address has been established, it can be communicated to the slave RAC module, for example, via the serial communication link. Also, in case of use of a dynamic host configuration protocol (DHCP) address, a newly assigned master can perform a check with the DHCP server to assure it has a valid lease on the IP address before continuing to bind the address. If the address is static, it can complete the bind and continue with chassis management responsibilities. The switchover, thus, includes a transfer of the exact network access including all addresses and using the same protocols. Hence, it can be ensured that no change is visible from the outside.

The master and slave RAC modules 500-1 and 500-2 can either be provided within a single RAC 205 as shown in FIG. 3 or they can be provided on separate modules within a chassis as shown in FIG. 2. A chassis may, thus, provide for a plurality of slave units/modules. Master and slave RAC module can be identical in hardware and only after insertion into the server chassis, the respective master/slave-mode will be automatically determined as described above. Each slave unit and the master unit can constitute a separate module. This can be in particular beneficial, when only two modules are present. Whenever the master RAC module fails to operate properly, the slave unit will take over responsibilities as a new master unit and indicate to a user the failure of the master unit. The user can then remove the inoperable former master unit from the chassis while the server will remain fully functioning. Then, the user can insert a new slave RAC module which will power up after insertion and serve as the new monitoring unit within the server chassis. The steps can be repeated if the new master unit fails. Thus, no down time of the system will occur.

If there are multiple slave units provided, each slave unit may have an assigned priority number. The slave unit with the highest priority number will then be the first to become a new master unit in case of a failure and so on. Exchange of failing modules can be performed as indicated above.

In addition to the foregoing, a method is taught for updating the firmware of a management resource such as RAC 205. Firmware updates for RAC 205 are complicated by the presence of redundant RAC modules where one of the modules is in a slave mode and the other is master. In cases where there is insufficient RAM or available flash storage on the RAC itself, firmware updates may be achieved by downloading a firmware image from an external server and storing the image locally. The locally stored image can then be used to update the firmware of both modules. Cost considerations prevent some implementations of RAC modules from including sufficient local storage to save a firmware image locally. The firmware update procedure described below is suitable for such environments.

In the case of a RAC 205 employing redundant RAC modules, conventional firmware update procedure includes first downloading the firmware image and flashing the first RAC module. After the first RAC modules firmware is updated, the administrator must remember to make the second RAC module the master RAC module and perform substantially the identical procedure that was followed to update the firmware on the first RAC module. It will be appreciated that the conventional mechanism is susceptible to human error such as when an administrator or user updates firmware on the first RAC module but fails to re-execute the firmware update procedure with the second RAC module as master.

In one aspect, a method for updating firmware in a information handling system is described. The information handling system includes a set of processing resources and a management resource. The processing resources, exemplified by server blades 102, include one or more general purpose processors and a system memory that is accessible to the microprocessors. The management resource is preferably operable to power-up, reset, and shutdown each of the processing resources individually. The management resources, exemplified by RAC 205, may include a first management module (e.g., RAC module 500-1) and a second management module (e.g., RAC module 500-2), where the second management module is redundant of the first management module.

The RAC 205 is operable to respond to a single firmware update request by updating firmware on the first RAC module and, after successfully updating the firmware on the first RAC module, updating firmware on the second RAC module, preferably without user interaction following the initial update request. The management modules communicate messages to each other indicating the beginning and ending of firmware update sequences. When one of the RAC modules is about to initiate a firmware update, it informs the other RAC module before rebooting into a firmware update sequence in which the RAC downloads the firmware image from a server. The non-updating RAC module enters a slave waiting loop in which it remains slave for a specified duration. If the non-updating RAC module has received a successful completion message from the updating RAC module, the slave RAC enters firmware update state, and the former master RAC having completed firmware update now enters slave mode with timer set to 5 minutes.

Some embodiments may be implemented as a computer program product (software). In such embodiments, the computer program product includes a set of computer executable instructions, stored on a computer readable medium. When executed by a processor, the instructions effect a method updating firmware of RAC 205.

Figure 7A:
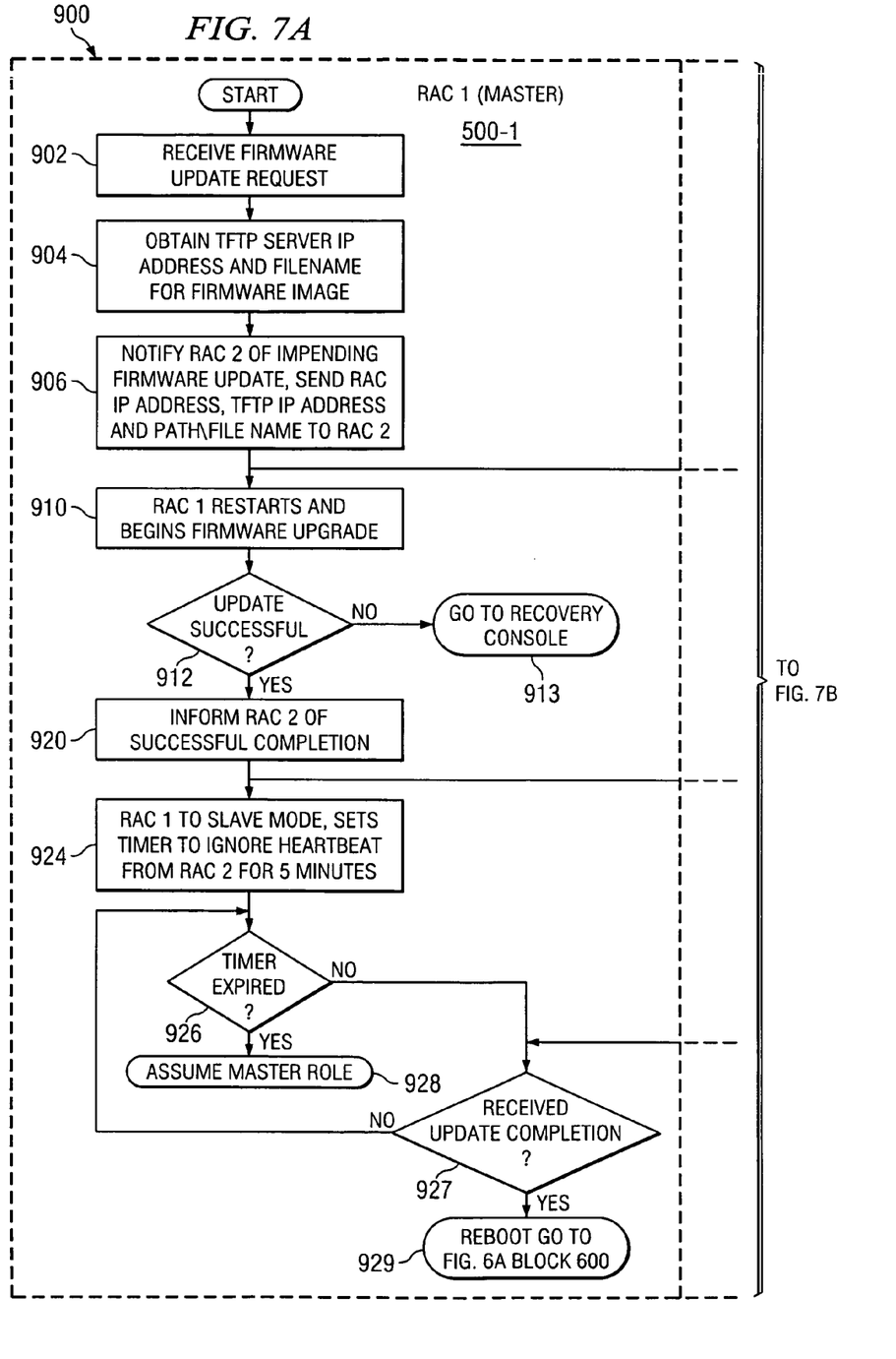
FIG. 7 is a flow diagram of selected elements of a method of updating firmware in the RAC module of FIG. 5.
Figure 7B:
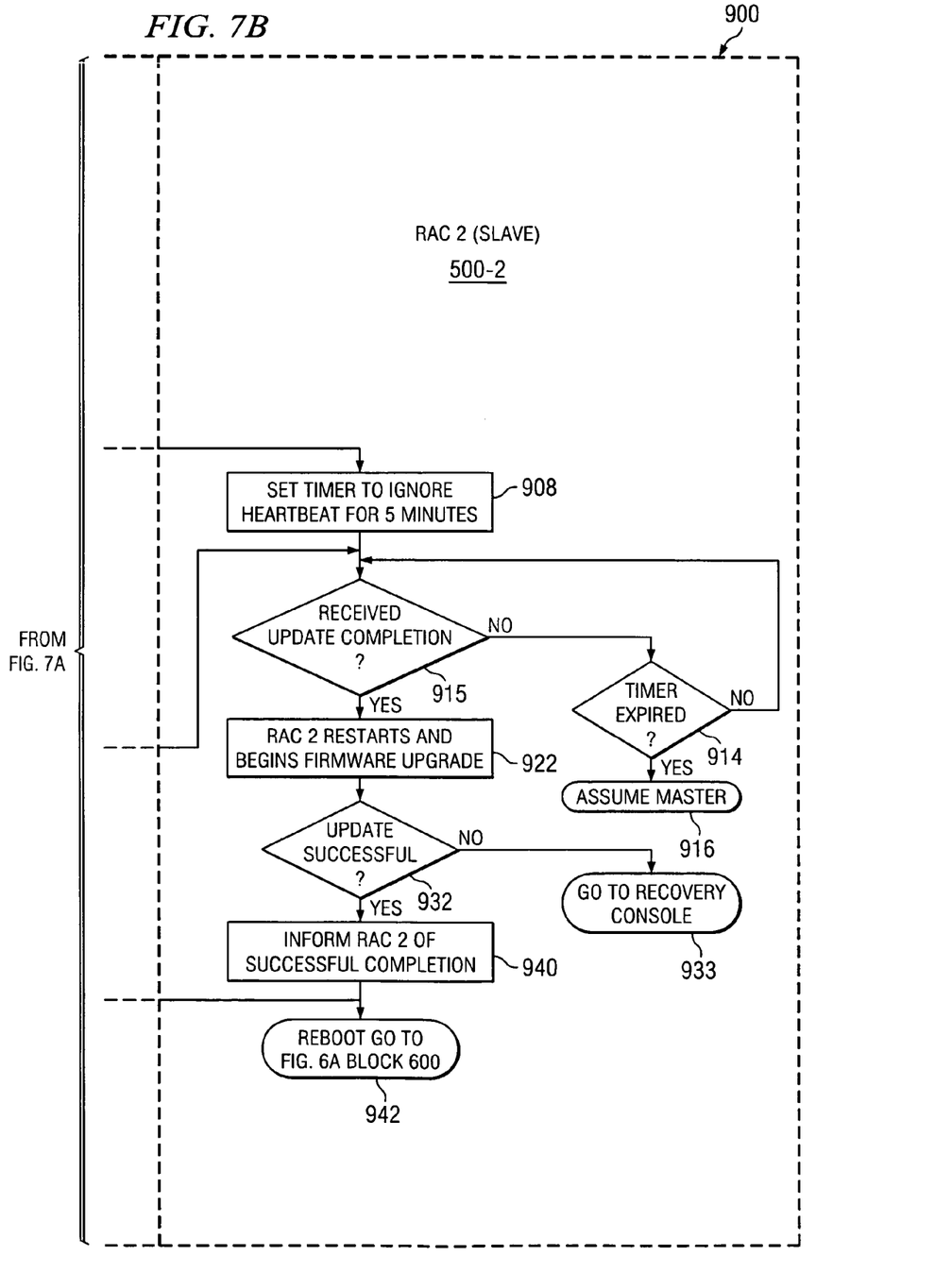

Referring now to FIG. 7, a flow diagram illustrating selected elements of an embodiment of a method 900 for updating the firmware of RAC 205 is presented. For purposes of FIG. 7, the master and slave RAC modules 500-1 and 500-2 referred to previously are referred to as first RAC module 500-1 and second RAC module 500-2 to emphasize that, at times during the described firmware update procedure, each of the RAC modules 500-1, 500-2 acts as the master RAC module.

It will be assumed for purposes of describing method 900 that, initially, both RAC modules are in an runtime mode and that first RAC module 500-1 is the master RAC module and second RAC module 500-2 is the slave RAC module. As depicted in FIG. 7, first RAC module 500-1 receives (block 902) a firmware update request. The firmware update request may be generated by an administrator connected to RAC 205. The administrator preferably connects to RAC 205 via a serial link or using a graphical user interface (GUI) via an intranet connection. In embodiments suitable for a networked implementation in which the firmware image is stored on a network-connected storage device, the firmware update procedure preferably uses TFTP (Trivial File Transfer Protocol) to retrieve the image from the network to the RAC. In such embodiments, the firmware update request initiated by the administrator preferably includes the IP address of a TFTP server that contains the firmware image and the location (e.g., directory path and file name) of a firmware image file stored on the TFTP server.

Upon receiving the firmware update request, first RAC module 500-1 parses or otherwise obtains (block 904) the TFTP server IP address and the firmware image filename from the request and stores the obtained information. In the depicted embodiment, before first RAC module 500-1 begins updating its firmware, first RAC module 500-1 notifies (block 906) second RAC module 500-2 that first RAC module 500-1 is about to initiate a firmware update. In one embodiment, first RAC module 500-1 informs second RAC module 500-1 by sending an Upgrade Active packet to second RAC module 500-2 including the TFTP server IP address and the path and filename of the firmware image file. The Upgrade Active may further include the IP address of the RAC itself. At this point, first RAC module 500-1 is still in the runtime/master state and second RAC module 500-2 is still in the runtime/slave mode.

In response to receiving the Upgrade Active packet from first RAC module 500-1, second RAC module 500-2 sets (block 908) a timer to a specified value or predetermined duration (e.g., five minutes) and enters a slave waiting loop during which time second RAC module 500-2 unconditionally remains in a slave mode. In other words, the slave waiting loop is used to prevent second RAC module 500-2 from assuming master status before first RAC module 500-1 has had the opportunity to complete its firmware image update procedure successfully.

As represented by block 914, 915, and 916, second RAC module 500-2 remains in the slave waiting loop for the specified duration (block 914) or until an Update Completed packet is received (block 915) from first RAC module 500-1. If, after expiration of the specified duration, second RAC module 500-2 has not received a message from first RAC module 500-1 indicating that first RAC module 500-1 has completed its update successfully, second RAC module 500-2 presumes that the firmware update of first RAC module 500-1 did not complete successfully and that first RAC module 500-1 is now in a corrupted or unknown state, at which point second RAC module 500-2 assumes (block 916) the master RAC module role.

After sending the Upgrade Active packet to second RAC module 500-2, first RAC module 500-1 reboots (block 910) into an update mode that starts the transfer of the firmware image from the TFTP server. Second RAC module 500-2 would normally detect and respond to a reboot of first RAC module 500-1 by asserting itself as the master (including loading a valid protocol stack). In an embodiment described in more detail below, first and second RAC modules 500-1 and 500-2 share a common IP address and media access control (MAC) address to make the redundant nature of RAC 205 transparent to the user. In such embodiments, it is necessary to prevent second RAC module 500-2 from loading an IP stack that would then contend with the protocol stack that first RAC module 500-1 is using to perform its firmware update.

If (block 912) the transfer and update of the firmware in first RAC module 500-1 completes successfully, first RAC module 500-1 sends a message to second RAC module 500-2 informing (block 920) second RAC module 500-2 of the successful completion. First RAC module 500-1 may include in its successful completion message the information needed by second RAC module 500-2 to initiate its own firmware update, assuming this information was not provided as part of the message sent from first RAC module 500-1 to second RAC module 500-2 as part of RAC 1 firmware update. The firmware updated information includes the IP address of the TFTP server and the location of the firmware image on the TFTP server.

If the firmware update of first RAC module 500-1 does not complete successfully, first RAC module 500-1, during a subsequent reboot, will detect the error condition (e.g., by checking a CRC value stored in first RAC module 500-1). Upon detecting such an error condition, first RAC module 500-1 will boot (block 913) into a Recovery Console. In one embodiment, the Recovery Console gives an administrator two options, namely, (1) update the RAC firmware via a serial port, or (2) update the RAC firmware via TFTP. If administrators choose option 2, they preferably supply the TFTP server IP address and the path\filename of firmware image as part of the request. If they choose option 1, a special program is run on the management station that transfers the file via the management stations serial port to the RAC.

First RAC module 500-1 then sets a timer for a specified duration, transitions (block 924) into a slave mode, and remains in the slave mode until the specified duration expires (block 926) or a successful completion message is sent (BLOCK 927) from RAC 2. The duration specified by first RAC module 500-1 is likely to be the same duration as that specified by second RAC module 500-2 in block 908.

Upon receiving the successful completion indication from first RAC module 500-1 and the firmware image information, second RAC module 500-2 begins its own update procedure by booting into update mode and initiating (block 922) the TFTP transfer of the firmware image from the TFTP server. If (block 932) second RAC module 500-2 completes its firmware transfer and update successfully, second RAC module 500-2 sends a message to first RAC module 500-1 informing first RAC module 500-1 that the firmware update of second RAC module 500-2 completed successfully. Second RAC module 500-2 then reboots (block 942) and enters an election phase as described above with respect to FIG. 6. Similarly, first RAC module 500-1 responds to receiving (block 927) a successful completion message from second RAC module 500-2 then reboots (block 929) and enters the election phase. In other embodiments, rebooting RACs 500-1 and 500-2 is avoided following successful completion of the firmware updated procedure by second RAC module 500-2. In these embodiments (not depicted in FIG. 9), first RAC module 500-1 assumes to master status following receipt of successful update message from second RAC module 500-2 and second RAC module 500-2 transitions to slave mode.

If, on the other hand, second RAC module 500-2 does not complete is firmware update successfully, first RAC module 500-1 will eventually determine, in block 926, that the specified duration has expired and that it has not received a successful completion message (block 927) from second RAC module 500-2. In this case, first RAC module 500-1 assumes (block 928) the master role. Moreover, during a subsequent reboot of second RAC module 500-2, the system will detect the failure (analogous to block 913 for first RAC module 500-1) and initiate (block 933) the Recovery Console to permit and administrator to restore the firmware (e.g., via Ethernet or a serial port).

As indicated previously, a single IP address and a single MAC address are used in one implementation to address the active RAC module whether the active module is first RAC module 500-1 or second RAC module 500-2. Using a single IP and MAC address improves the transparency of the redundant RAC and beneficially permits an implementation in which RAC 205 obtains its IP address dynamically from a DHCP server. To prevent contention between the two RAC's, only one RAC has its network protocol stack loaded at any time. The single MAC address used for both RAC modules is a software loadable MAC address. In one implementation, a chassis MAC address, that is stored in non-volatile memory (e.g., a battery backed CMOS), is assigned to the active RAC module.

Although the disclosed embodiments have been described in detail, it should be understood that various changes, substitutions and alterations can be made to the embodiments without departing from their spirit and scope.

What is claimed is:

1. An information handling system comprising:
   a set of processing resources, each including a microprocessor and memory accessible to the microprocessor; and
   a management resource, operable to power-up, reset, and shutdown each of the set of processing resources, wherein the management resource includes a first management module and a second management module, wherein the second management module is redundant of the first management module;
   wherein the management resource is operable to respond to a firmware update request by updating firmware on the first management module while maintaining the second management module in a slave mode, during such update maintaining the first management module in a master mode, and, responsive to successfully updating the firmware on the first management module, updating firmware on the second management module while maintaining the first management module in a slave mode, during such update neither the first management module nor the second management module function in a master mode.

2. The information handling system of claim 1, wherein updating management module firmware further includes, prior to said first management module rebooting, the first management module informing the second management module that the first management module will initiate the first transfer of the firmware image.

3. The information handling system of claim 2, further comprising, responsive to said first management module informing the second management module, the second management module remaining in a slave mode for a specified duration.

4. The information handling system of claim 3, further comprising, responsive to said specified duration expiring without an indication of completion from the first management module, the second management module assuming active control.

5. The information handling system of claim 1, wherein said updating firmware on the first and second management modules comprises updating firmware on the first management module using a first trivial file transfer protocol (TFTP) request and updating firmware on the second management module using a second TFTP request.

6. The information handling system of claim 1, wherein the first and second management modules employ a common IP address and a common MAC address.

7. A computer program product comprising instructions, stored on a non-transitory computer readable medium, for updating firmware in a management resource of an information handling system, the instructions comprising:
  instructions for responding to a firmware update request by initiating a firmware update of a first RAC module of the management resource and causing a second RAC module to enter a slave mode for a specified duration, the instructions for initiating the firmware of the first RAC module including
    instructions for rebooting the first RAC module into an update mode, the update mode including configuring the first RAC module in a master mode;
  instructions for sending a message from the first RAC module to the second RAC module upon successful completion of the firmware update;
  instructions for responding to expiration of the specified time period without the first RAC module sending the successful message by causing the second RAC module to become the active RAC; and
  instructions for responding to the successful completion message being sent from the first RAC module to the second RAC module by initiating a firmware update of the second RAC module, during such firmware update of the second RAC module neither the first RAC module nor the second RAC module function in a master mode.

8. The computer program product of claim 7, wherein the instructions for using the stored server IP address and firmware image location to retrieve the firmware image includes instructions for initiating a TFTP transfer of the firmware image from the server IP address.

9. The computer program product of claim 7, further comprising instructions for causing the first RAC module to enter a slave mode for a specified duration responsive to the second RAC module initiating a firmware update.

10. The computer program product of claim 9, further comprising instructions for causing the first RAC to exit the slave mode and assume active control responsive to expiration of specified duration with a successful completion message from the second RAC module.

11. The computer program product of claim 7, wherein the instructions for initiating the firmware update of the first and second RAC modules comprise instructions for downloading a firmware image from a server using a trivial file transfer protocol (TFTP).

12. The computer program product of claim 11, wherein an IP address of the first RAC module during the firmware update of the first RAC module is the same as an IP address of the second RAC module during the firmware update of the second RAC module.

13. The computer program product of claim 12, wherein a media access control (MAC) of the first RAC module during the firmware update of the first RAC module is the same as a MAC address of the second RAC module firmware update of the second RAC module.

14. A method of updating firmware in a management resource of an information handling system, the management resource having a first module and a redundant second module, comprising:
  responsive to a firmware update request, rebooting the first module into an update mode, the update mode including configuring the first module in a master mode, while maintaining the redundant second module in a slave mode; and
  responsive to a firmware update request, transferring a firmware image from a networked server to a flash memory device of a first module of the management resource;
  responsive to successfully transferring the firmware image to the first module, transferring the firmware image from the networked server to a flash memory device of the redundant second module;
  responsive to a specified duration expiring before successfully transferring the firmware image to the flash memory device of the first module, causing the second module to assume control; and
  responsive to a successful completion message being sent from the first module to the second module, initiating a firmware update of the second module, during such firmware update of the second module neither the first module nor the second module function in a master mode.

15. The method of claim 14, wherein transferring the firmware image to the first device includes sending a message to the second module indicating the first module as beginning a firmware update and rebooting the first module into an update mode to initiate said transferring.

16. The method of claim 15, further comprising, responsive to the second module receiving the message, the second module entering a slave mode for a specified duration, wherein said second module is prevented from assuming management control during the specified duration.

17. The method of claim 16, further comprising, responsive to transferring the firmware image to the flash memory device of the first module, sending a successful completion message to second module and rebooting the first module into a slave mode, wherein the second module responds to the successful completion message by rebooting into an update mode to initiate said transferring of the firmware image to the redundant second module.

18. The method of claim 17, wherein a first IP address and a first MAC address are used to address the first module during said transferring of the firmware image to the first module and wherein the first IP address and the first MAC address are used to address the redundant second module during said transferring of the firmware image to the redundant second module.

19. The information handling system of claim 1, wherein updating firmware on the first management module includes:
  the first management module parsing an IP address of a TFTP server and information indicating the path and filename for a firmware file stored on the TFTP, wherein the firmware file contains a firmware image;
  the first management module rebooting to initiate a transfer of the firmware image from the TFTP server to flash memory of the first management module;
  upon completing the first transfer successfully, the first management module notifying the second management module; and
  responsive to the first management module notifying the second management module, the second management module rebooting to initiate a second transfer of the firmware image.

20. The computer program product of claim 7, wherein the instructions for initiating the firmware of the first RAC module further include:
  instructions for parsing and storing server IP address and firmware image location information from the request; and instructions for using the stored server IP address and firmware image location to retrieve the firmware image from the server IP address.

\* \* \* \* \*